(12) United States Patent
Jiang (10) Patent No.: US 7,684,793 B2
(45) Date of Patent: Mar. 23, 2010

(54) ANTI-TRAFFIC REDIRECTION SYSTEM

(75) Inventor: John Yue Jun Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 1014 days.

(21) Appl. No.: 11/374,437

(22) Filed: Mar. 14, 2006

(65) Prior Publication Data

US 2006/0246898 A1 Nov. 2, 2006

Related U.S. Application Data

(63) Continuation-in-part of application No. 10/635,804, filed on Aug. 5, 2003, now Pat. No. 7,072,651.

(60) Provisional application No. 60/662,030, filed on Mar. 14, 2005.

(51) Int. Cl.
*G06F 15/16* (2006.01)

(52) U.S. Cl. .................................. 455/432.1; 455/435.1

(58) Field of Classification Search ............... 455/432.1, 455/433, 435.1
See application file for complete search history.

(56) References Cited

U.S. PATENT DOCUMENTS

| 5,353,328 | A | 10/1994 | Jokimies |
| 5,586,166 | A | 12/1996 | Turban |
| 5,742,910 | A | 4/1998 | Gallant et al. |
| 5,764,730 | A | 6/1998 | Rabe et al. |
| 5,818,824 | A | 10/1998 | Lu et al. |
| 5,854,982 | A | 12/1998 | Chambers et al. |
| 5,901,359 | A | 5/1999 | Malmstrom |
| 5,903,832 | A | 5/1999 | Seppanen et al. |
| 5,930,701 | A | 7/1999 | Skog |
| 5,940,490 | A | 8/1999 | Foster et al. |
| 5,943,620 | A | 8/1999 | Boltz et al. |
| 5,953,653 | A | 9/1999 | Josenhans et al. |

(Continued)

FOREIGN PATENT DOCUMENTS

CA    2281041 A1    2/2001

(Continued)

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).

(Continued)

*Primary Examiner*—Sam Bhattacharya
(74) *Attorney, Agent, or Firm*—Arent Fox LLP (57) ABSTRACT

A system for controlling traffic between a Home Public Mobile Network (HPMN) and a Visiting Public Mobile Network (VPMN) of a roaming mobile station is provided. The system includes a TR probe for detecting a traffic redirection (TR) attempt for the roaming mobile station, by observing exchange of at least one registration message between the VPMN and the HPMN. The system further includes an anti-TR unit for thwarting the TR attempt by sending one or more registration response messages in response to the at least one registration message received from a switch.

60 Claims, 5 Drawing Sheets

U.S. PATENT DOCUMENTS

| | | | |
|---|---|---|---|
| 5,987,318 | A | 11/1999 | Alperovich et al. |
| 5,987,323 | A | 11/1999 | Huotari |
| 5,987,325 | A | 11/1999 | Tayloe |
| 6,014,561 | A | 1/2000 | Mölne |
| 6,052,604 | A | 4/2000 | Bishop et al. |
| 6,058,309 | A | 5/2000 | Huang et al. |
| 6,075,855 | A | 6/2000 | Christiansen et al. |
| 6,085,084 | A | 7/2000 | Christmas |
| 6,138,005 | A | 10/2000 | Park |
| 6,138,009 | A | 10/2000 | Birgerson |
| 6,148,197 | A | 11/2000 | Bridges et al. |
| 6,163,701 | A | 12/2000 | Saleh et al. |
| 6,185,295 | B1 | 2/2001 | Frederiksen et al. |
| 6,185,436 | B1 | 2/2001 | Vu |
| 6,192,255 | B1 | 2/2001 | Lewis et al. |
| 6,195,532 | B1 | 2/2001 | Bamburak et al. |
| 6,208,864 | B1 | 3/2001 | Agrawal et al. |
| 6,212,372 | B1 | 4/2001 | Julin |
| 6,356,755 | B1 | 3/2002 | Valentine et al. |
| 6,356,756 | B1 | 3/2002 | Koster |
| 6,456,845 | B1 | 9/2002 | Drum et al. |
| 6,456,859 | B1 | 9/2002 | Desblancs et al. |
| 6,463,298 | B1 | 10/2002 | Sorenson et al. |
| 6,466,786 | B1 | 10/2002 | Wallenius |
| 6,505,050 | B1 | 1/2003 | Brudos et al. |
| 6,515,974 | B1 | 2/2003 | Inoue et al. |
| 6,574,481 | B1 | 6/2003 | Rathnasabapathy et al. |
| 6,603,761 | B1 | 8/2003 | Wang et al. |
| 6,603,968 | B2 | 8/2003 | Anvekar et al. |
| 6,611,516 | B1 | 8/2003 | Pirkola et al. |
| 6,628,934 | B2 | 9/2003 | Rosenberg et al. |
| 6,636,502 | B1 | 10/2003 | Lager et al. |
| 6,671,523 | B1 | 12/2003 | Niepel et al. |
| 6,684,073 | B1 | 1/2004 | Joss et al. |
| 6,693,586 | B1 | 2/2004 | Walters et al. |
| 6,738,622 | B1 | 5/2004 | Stadelmann et al. |
| 6,738,636 | B2 | 5/2004 | Lielbridis |
| 6,764,003 | B1 | 7/2004 | Martshitsch et al. |
| 6,782,264 | B2 | 8/2004 | Anderson |
| 6,795,444 | B1 | 9/2004 | Vo et al. |
| 6,856,818 | B1 | 2/2005 | Ford |
| 6,876,860 | B1 | 4/2005 | Berg et al. |
| 6,920,487 | B2 | 7/2005 | Sofer et al. |
| 6,925,299 | B1 | 8/2005 | Sofer et al. |
| 6,961,559 | B1 | 11/2005 | Chow et al. |
| 6,963,543 | B2 | 11/2005 | Diep et al. |
| 6,968,383 | B1 | 11/2005 | Heutschi et al. |
| 6,975,852 | B1 | 12/2005 | Sofer et al. |
| 6,978,156 | B1 | 12/2005 | Papadopoulos et al. |
| 7,020,479 | B2 | 3/2006 | Martschitsch |
| 7,139,570 | B2 | 11/2006 | Elkarat et al. |
| 7,184,764 | B2 | 2/2007 | Raviv et al. |
| 7,231,431 | B2 | 6/2007 | Sofer et al. |
| 2002/0009199 | A1 | 1/2002 | Ala-Laurila et al. |
| 2002/0012351 | A1 | 1/2002 | Sofer et al. |
| 2002/0037708 | A1 | 3/2002 | McCann et al. |
| 2002/0087631 | A1 | 7/2002 | Sharma |
| 2002/0101858 | A1 | 8/2002 | Stuart et al. |
| 2002/0101859 | A1 | 8/2002 | Maclean |
| 2002/0160763 | A1 | 10/2002 | Mittal et al. |
| 2002/0187780 | A1 | 12/2002 | Souissi |
| 2002/0191575 | A1 | 12/2002 | Kalavade et al. |
| 2002/0196775 | A1 | 12/2002 | Tuohino et al. |
| 2003/0017843 | A1 | 1/2003 | Noblins |
| 2003/0050047 | A1 | 3/2003 | Ala-Luukko |
| 2003/0051041 | A1 | 3/2003 | Kalavade et al. |
| 2003/0064723 | A1 | 4/2003 | Thakker |
| 2003/0069922 | A1 | 4/2003 | Arunachalam |
| 2003/0129991 | A1 | 7/2003 | Allison et al. |
| 2003/0133421 | A1 | 7/2003 | Sundar et al. |
| 2003/0139180 | A1 | 7/2003 | McIntosh et al. |
| 2003/0208560 | A1 | 11/2003 | Inoue |
| 2003/0224795 | A1 | 12/2003 | Wilhoite et al. |
| 2003/0229791 | A1 | 12/2003 | De Jong |
| 2004/0019539 | A1 | 1/2004 | Raman et al. |
| 2004/0053610 | A1 | 3/2004 | Kim |
| 2004/0082346 | A1 | 4/2004 | Skytt et al. |
| 2004/0087305 | A1 | 5/2004 | Jiang |
| 2004/0120552 | A1 | 6/2004 | Borngraber et al. |
| 2004/0131023 | A1 | 7/2004 | Auterinen |
| 2004/0132449 | A1 | 7/2004 | Kowarsch |
| 2004/0148400 | A1 | 7/2004 | Mostafa |
| 2004/0196858 | A1 | 10/2004 | Tsai et al. |
| 2004/0224680 | A1 | 11/2004 | Jiang |
| 2004/0229601 | A1 | 11/2004 | Zabawskyj et al. |
| 2004/0236836 | A1 | 11/2004 | Appelman |
| 2005/0021834 | A1 | 1/2005 | Coulombe |
| 2005/0047378 | A1 | 3/2005 | Wuschke et al. |
| 2005/0064883 | A1 | 3/2005 | Heck et al. |
| 2005/0070278 | A1 | 3/2005 | Jiang |
| 2005/0186939 | A1 | 8/2005 | Barnea et al. |
| 2005/0186960 | A1 | 8/2005 | Jiang |
| 2005/0186979 | A1 | 8/2005 | McCann et al. |
| 2005/0192007 | A1 | 9/2005 | Kumar et al. |
| 2005/0192036 | A1 | 9/2005 | Greenwood et al. |
| 2005/0215250 | A1 | 9/2005 | Chava et al. |
| 2005/0232282 | A1 | 10/2005 | Silver et al. |
| 2005/0250493 | A1 | 11/2005 | Elkarat et al. |
| 2006/0003775 | A1 | 1/2006 | Bull et al. |
| 2006/0009204 | A1 | 1/2006 | Ophir |
| 2006/0025129 | A1 | 2/2006 | Wolfman et al. |
| 2006/0052113 | A1 | 3/2006 | Ophir et al. |
| 2006/0068778 | A1 | 3/2006 | Della-Torre |
| 2006/0068786 | A1 | 3/2006 | Florence |
| 2006/0079225 | A1 | 4/2006 | Wolfman et al. |
| 2006/0079236 | A1 | 4/2006 | Del Pino et al. |
| 2006/0148459 | A1 | 7/2006 | Wolfman et al. |
| 2006/0205404 | A1 | 9/2006 | Gonen et al. |
| 2006/0211420 | A1 | 9/2006 | Ophir et al. |
| 2007/0021118 | A1 | 1/2007 | Ophir et al. |
| 2007/0049269 | A1 | 3/2007 | Ophir et al. |
| 2007/0054665 | A1 | 3/2007 | Elkarat et al. |
| 2007/0072587 | A1 | 3/2007 | Della-Torre et al. |
| 2007/0178885 | A1 | 8/2007 | Lev et al. |
| 2007/0232300 | A1 | 10/2007 | Wolfman |
| 2007/0259663 | A1 | 11/2007 | Weintraub et al. |
| 2008/0020760 | A1 | 1/2008 | Elkarat et al. |
| 2008/0125116 | A1* | 5/2008 | Jiang .................. 455/433 |

FOREIGN PATENT DOCUMENTS

| | | |
|---|---|---|
| EP | 0899 974 A2 | 3/1999 |
| GB | 2322998 | 9/1998 |
| WO | WO 98/26621 A2 | 6/1998 |
| WO | WO 98/26626 A2 | 6/1998 |
| WO | WO 00/018156 A1 | 3/2000 |
| WO | WO 00/51375 A | 8/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/019667 | 7/2002 |
| WO | WO 03/019960 A1 | 3/2003 |
| WO | WO 03/043367 A | 5/2003 |
| WO | WO 03/065660 A | 8/2003 |
| WO | WO 2004/081802 | 9/2004 |
| WO | WO2004/075598 | 9/2005 |
| WO | WO2005/101857 | 10/2005 |
| WO | WO2008/012815 | 1/2008 |

OTHER PUBLICATIONS

"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573).

"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002. pp. 1-102 (XP-002298277).

Ala-Laurila, et al., "Wireless LAN Access Network Architecture for Mobile Operators," IEEE Communications Magazine, Nov. 2001, pp. 82-89 (XP-001107810).

Brunen, M. "Roaming im Zugangsnetz Mit OWLAN uberall zu Hause sein," Net-Zeitschrift Fuer Kommunikationsmangement, Huthig Verlag, Heilderberg, 2002, pp. 39-42 (XP-001122438).

GSM Association Permanent Reference Document: IR.33, PRD IR.33 "GPRS Roaming Guidelines," version 3.2.0, Apr. 3, 2003, pp. 1-20 (XP-002298278).

Ostrowski, F., "Roaming und Handover zwischen UMTS und Funk-LA," NTZ (Nachrichtentechnische zeitschrift), 2002, pp. 24-26 (XP-001132263).

Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).

"Universal Mobile Telecommunications system (UMTS) NAS Functions Related to Mobile Station MS in Idle Mode" ETSI TS 123 122 V3.1.0, Jan. 2000, pp. 1-33.

"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.

Salman A. Baset et al., "An analysis of the Skype Peer-to-Peer Internet Telephony Protocol", Department of Computer Science, Sep. 15, 2004, 12 pages.

Salkintzis, et al., "WLAN-GPRS Integration for Next-Generation Mobile Data Networks," IEEE Wireless Communications, Oct. 2002, pp. 112-123 (XP-001132263).

Michael Mouly, "The GSM System for Mobile Communications", pp. 103-104. Cell and Sys, 1992.

GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).

GSM978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).

GSM 902 on MAP Specification Digital Cellular Telecommunications (Phase 2+); Mobile Application Part (MAP) Specification (3GPP TS 09.02 version 7.9.0 Release 1998).

Q764 (1999), Signaling System No. 7—ISDN User Part signaling procedures.

Q 730 (1999), ISDN User Part supplementary services.

Q 711 (1996), Functional description of signaling connection control part.

Q 712 (1996), Definition and function of signaling connection control part messages.

Q713 (1996), Signaling connection control part formats and codes.

Q 714 (1996), Signal connection control part procedures.

Q 716 (1993), Signaling Connection Control Part (SCCP) performance.

GSM 340 on SMS Digital cellular telecommunications system (Phase 2+); Technical realization of the Short Message Service (SMS); (GSM 03.40 version 7.4.0 Release 1998).

SMPP Forum: SMPP Protocol Document Version:—Oct. 12, 1999 Issue 1.2.

GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).

Technical Specification 3$^{rd}$ Generation Partnership Project; Technical Specification Group Services and System Aspects; Service accessibility (Release 1999).

Signaling procedure and the Mobile Application Part (MAP) (Release 1999).

GMS 408 on radio interface layer 3; Digital cellular telecommunications system (Phase 2+); Mobile radio interface layer 3 specification (GSM 04.08 version 7.4.2 Release 1998).

GSM 322 network selection Digital cellular telecommunications system (Phase 2+); functions related to Mobile Station (MS) in idle mode and group receive mode (GSM 03.22 version 8.3.0 Release 1999).

GSM 23122 network selection 3GPP TS 23.122 V3.9.0 (Dec. 2002) Technical Specification; 3$^{rd}$ Generation Partnership Project; Technical Specification Group Core Network; NAS Functions related to Mobile Station (MS) in idle mode (release 1999).

GSM 22011 service accessibility; 3 GPP TS 22.011 V3.8.0 (Sep. 2002) Technical Specification; 3$^{rd}$ Generation Partnership Project; Technical Specification Group Services and System Aspects; Service accessibility (Release 1999).

GSM 318 on CAMEL Basic Call Handling; Digital cellular telecommunications system (Phase 2+) Basic call handling; Technical realization (GSM 03.18 version 6.6.0 Release 1997).

ITU-T Recommendation Q. 766 (1993), Performance objectives in the integrated services digital network application.

ITU-T Recommendation Q. 765 (1998), Signaling system No. 7—Application transport mechanism.

ITU-T Recommendation Q. 769.1 (1999), Signaling system No. 7—ISDN user part enhancements for the support of Number Portability.

3G TS 22.078 version 3.2.0 Release 1999 UMTS CAMEL.

GSM 03.48 version 8.3.0 Release 1999; ETSI TS 101 181 V8.3.0; Digital cellular telecommunications system (Phase 2+); Security Mechanisms for the SIM application toolkit; Stage 2; pp. 1-34; (Aug. 2000).

3GPP TS 29.002 version 4.9.0 Release 4; ETSI TS 129 002 V4.9.0; Digital cellular telecommunications system (Phase 2+); Universal Mobile Telecommunications System (UMTS); Mobile Application Part (MAP) specification; pp. 1-1286; (Sep. 2002).

GSM 09.60 version 7.4.1 Release 1998; ETSI EN 301 347 V7.4.1; Digital cellular telecommunications system (Phase 2+), General Packet Radio Service (GPRS); GPRS Tunnelling Protocol (GTP) across the Gn and Gp Interface; pp. 1-67; (Nov. 2000).

ITU-T—Q.705; Specifications of Signalling System No. 7; Signalling System No. 7—Signalling Network Structure; pp. 1-27; (Mar. 1993).

Q.761 (Functional description of the ISDN User Part of CCITT Signaling System No. 7) (May 1998).

Q762 (General Functions of CCITT Signaling System No. 7 ISDN User Part Messages and parameters). 1999.

Q 763 (Formats and codes of CCITT Signaling System No. 7 ISDN User Part Message and parameters). 1999.

Universal Mobile Telecommunications System (UMTS); Multimedia Messaging Service (MMS), Functional description; Stage 2 (3GPP TS 23.140 version 4.2.0 Release 4) (Mar. 22, 2001).

Q1214, ITU-T Intelligent Network Distributed Functional Plane for Intelligent Network CS-1. 1995.

Q1215, ITU-T Physical Plane for Intelligent Network CS-1. 1995.

Q1218 ITU-T Interface Recommendation for Intelligent Network CS-1. 1995.

3 GPP 29010; 3 GPP TS 29.010 V3. 10.0; Technical Specification; 3$^{rd}$ Generation Partnership Project; Technical Specification Group Core Network; Information element mapping between Mobile Station—Base Station System (MS-BSS) and Base Station System—Mobile-services Switching Centre (BSS—MSC); (Dec. 2002).

ITU-T Q.771 Series Q: Switching and Signalling—Specifications of Signalling System No. 7—Transaction capabilities application part. Functional description of transaction capabilities (Jun. 1997).

ITU-T Q.772 Series Q: Switching and Signalling—Specifications of Signalling System No. 7—Transaction capabilities application part. Transaction capabilities information element definitions (Jun. 1997).

ITU-T Q.773 Series Q: Switching and Signalling—Specifications of Signalling System No. 7—Transaction capabilities application part. Transaction capabilities formats and encoding (Jun. 1997).

ITU-T Q.774 Series Q: Switching and Signalling—Specifications of Signalling System No. 7—Transaction capabilities application part. Transaction capabilities procedures. (Jun. 1997).

ITU-T Q.775 Series Q: Switching and Signalling—Specifications of Signalling System No. 7—Transaction capabilities application part. Guidelines for using transaction capabilities. (Jun. 1997).

GSM 11.11 Digital Cellular Telecommunications System (Phase 2+); Specification of the Subscriber Identity Module—Mobile Equipment (SIM-ME) Interface. Dec. 1995, version 5.0.0.

GSM 1114 SIM Toolkit. (Dec. 1996).

IR 7320 Steering of Roaming Implementation Guidelines 0.1. May 13, 2005.

GSM 31048 Security and OTA (Oct. 2005).

GSM 23.119 $3^{rd}$ Generation Partnership Project; Technical Specification Group Core Network; Gateway Location Register (GLR)—Stage 2 (3G TS 23.119 version 0.3.0). 1999.

GSM 408 Mobile Radio Interface Network Layer (May 1996).

GSM 23122 NAS Functions Related to Mobile Station (MS) in Idle Mode. 1999.

GSM 24.008 Digital Cellular Telecommunications Systems (Phase 2+) (GSM); Universal Mobile Telecommunications System (UMTS); Mobile Radio Interface Network Layer 3 Specification, Core Network Protocols—Stage 3 (3G TS 24.008 version 3.2.1 Release 1999) Jan. 2000.

GSM 253.04 $3^{rd}$ Generation Partnership Project; Technical Specification Group Radio Access Network; UE Procedures in Idle Mode (3G TS 25.304 version 3.0.0) 1999.

GSM 29.010 Error Network Mapping (Dec. 2002).

3G TS 23.278 version 6.0.0. Release 6 $3^{rd}$ Generation Partnership Project; Technical Specification Group Core Network; Customized Applications for Mobile Network Enhanced Logic (CAMEL) Phase 4-Stage 2; IM CN Interworking. 2004.

GSM 360 GPRS Roaming Guidelines PRD IR.33. Apr. 3, 2003 Version 3.2.0.

GSM 23060 $3^{rd}$ Generation Partnership Project; Technical Specification Group Services and System Aspects; General Packet Radio Service (GPRS); Service description; Stage 2 (Release 5). 2002.

GSM 29060 $3^{rd}$ Generation Partnership Project; Technical Specification Group Core Network; General Packet Radio Service (GPRS); GPRS Tunneling Protocol (GTP) across the Gn and Gp interface (release 1999).

GSM 23.012 $3^{rd}$ Generation Partnership Project; Technical Specification Group Core Network; Location Management Procedures (Release 4) 2001.

Q701, Specifications of Signalling System No. 7—Functional Description of the Message Transfer Part (MTP) of Signalling System No. 7. 1993.

Q702 ITU-T Specifications of Signalling System No. 7, Signalling Data Link. 1993.

Q703 ITU-T Specifications of Signalling System No. 7—Message Transfer Part. Signalling link, 1996.

Q704, Signalling network functions and messages. Specifications of Signalling System No. 7—Message Transfer Part. (Jul. 1996).

* cited by examiner

ANTI-TRAFFIC REDIRECTION SYSTEM

RELATED APPLICATIONS

This application claims priority from U.S. Provisional Patent Application Ser. No. 60/662,030 entitled "Method and Apparatus for Defense Against Network Traffic Redirection", filed Mar. 14, 2005 and is a continuation-in-part of United States Patent Application entitled "Method And System For Cellular Network Traffic Redirection" application Ser. No. 10/635,804 filed on Aug. 05, 2003, now U.S. Pat. No. 7,072,651 claiming priority from Aug. 05, 2002. Both of those related patent applications are incorporated herein by this reference in their entirety.

BACKGROUND OF THE INVENTION

1. Field of the Invention

The present invention generally relates to international roamers. More specifically, the invention relates to traffic control for the international roamers.

2. Background of the Technology

Common carrier Mobile communication systems are deployed by different companies and network operators within almost every country around the world. Many of those network operators offer international roaming to their subscribers traveling abroad, and to travelers visiting their territory and using their foreign mobile telephones. Over the last few years, revenues to the network operators from home subscribers have consistently declined due to increased competition and resulting pricing pressures. On the other hand, revenues from roamers have consistently grown in the same period due to increased mobile penetration in local markets and an increase in travel. Various network operators have preferred bilateral roaming agreements ("partnerships") with each other that include more favorable roaming charges than non-partnership operators. Therefore, "preferred" visited networks are those that the home network prefers its outbound roamers to register with when traveling outside their home coverage area. Non-partner networks are "non-preferred".

Network operators can maximize their margins and the roamers can get more attractive roaming rates and services if roamers roam on their home mobile operator's preferred (or partner) networks. When the subscribers roam into visited networks from a HPMN, they may roam onto one, two or more VPMNs, one at a time, based on various criteria. These VPMNs may also include the "non-preferred" VPMN networks. Hence, protecting the existing roaming revenues and growing them further has become an important priority for the network operators worldwide. However, current methods of controlling which network a subscriber registers to when he/she is roaming have certain disadvantages.

The HPMN operators use traffic redirections techniques in their networks in order to discourage their subscribers' handsets to roam with the "non-preferred" VPMN networks. Sometimes, the HPMN operator can use traffic redirection techniques to control the distribution of outbound roamers among VPMN networks in a country so that the "preferred" VPMN network will get a very high percentage of the HPMN's roaming traffic and the "non-preferred" VPMN networks will get a low percentage of that roaming traffic. Those traffic redirections techniques used by an HPMN operator can deprive the non-preferred VPMN operators of inbound roaming revenues. Sometimes these VPMN operators may have a partnership with the HPMN and may even be the "preferred" networks. Furthermore, the traffic redirection that is based on rejection error, timeout or abort techniques generates network errors to the mobile handset's radio interface. The generation of these errors compels the mobile handset to initiate again a number of registration attempts. This can overload the network interface between the HPMN and the VPMN.

In cases when there are more than two VPMN operators in a country, some competing and "non-preferred" VPMN networks also deploy a form of traffic redirection at their end to retain the inbound roamers by stopping them leaking out of their network. This leads to decrease in revenues for the other VPMN operators. It would be disadvantageous for these VPMN network operators to relinquish the control of the subscriber even when a handset has initiated a registration attempt with a non-preferred network for any reason, such as failure of the SIM network list to produce registration on a preferred network.

Due to one or more of the above issues, there is a need in the art to counter outbound traffic redirection by the HPMN operator and also to counter inbound traffic redirection by competing VPMN operators.

BRIEF DESCRIPTION OF DRAWINGS

In the drawings, the same or similar reference numbers identify similar elements or acts.

DETAILED DESCRIPTION

A method for controlling traffic between a Home Public Mobile Network (HPMN) and a Visiting Public Mobile Network (VPMN) of a roaming mobile station is provided. The method includes detecting a traffic redirection (TR) attempt for the roaming mobile station, by observing the exchange of at least one registration message between the VPMN and the HPMN. The method further includes thwarting the detected TR attempt by sending one or more registration response messages in response to that registration message. The one or more registration response message thwarts the TR attempt.

A system for controlling traffic between a Home Public Mobile Network (HPMN) and a Visiting Public Mobile Network (VPMN) of a roaming mobile station is also provided. The system includes a TR probe for detecting a traffic redirection (TR) attempt for the roaming mobile station, by observing exchange of at least one registration message between the VPMN and the HPMN. The system further includes an anti-TR unit for thwarting the TR attempt by sending one or more registration response messages in response to the at least one registration message received from a switch.

The following description provides specific details for a thorough understanding and an enabling description for various embodiments of Anti-Traffic Redirection System (ATRS). However, one skilled in the art will understand that the ATRS may be practiced without these details. In other instances, well-known structures and functions have not been shown or described in detail to avoid unnecessarily obscuring the description of the embodiments of the ATRS. The headings provided herein are for convenience only and do not affect the scope or meaning of the claimed invention.

Anti-TR System

Figure 1:
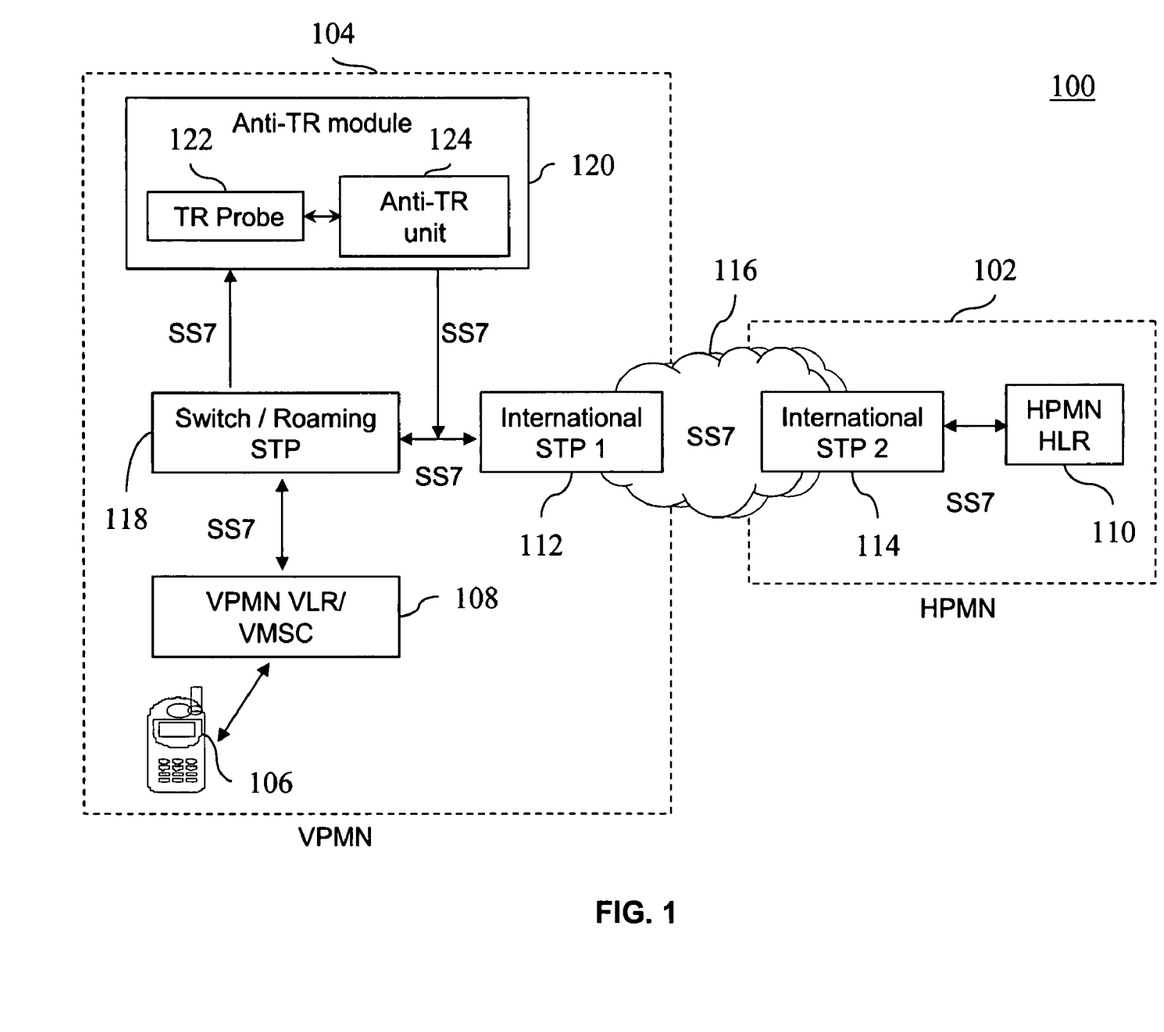
FIG. 1 represents a system for controlling traffic between a Home Public Mobile Network (HPMN) and a Visiting Public Mobile Network (VPMN) of a roaming mobile station, in accordance with an embodiment of the invention.

FIG. 1 represents a system 100 for controlling traffic between a Home Public Mobile Network (HPMN) 102 and a Visiting Public Mobile Network (VPMN) 104 of a roaming mobile station 106, in accordance with an embodiment of the invention. The roaming mobile station 106 (or a roamer) is connected to a VPMN operator at a VPMN VLR 108, while it is roaming from the HPMN 102. In one embodiment of the invention, the VPMN VLR 108 is integrated with a VMSC in the VPMN 104. Notwithstanding, both the VPMN VLR and the VMSC may have different logical addresses. Subscriber profile data corresponding to the roaming mobile station 106 is stored in HPMN HLR 110. The signaling corresponding to roaming mobile station 106 is routed using an international STP 1 112 at VPMN 104 and international STP 2 114 at HPMN 102. The signaling between HPMN 102 and VPMN 104 is carried using SS7 signaling architecture 116. The signals exchanged between HPMN 102 and VPMN 104 are MAP based signals. The VPMN VLR 108 interacts with the international STP 1 112 via a switch 118. In one embodiment of the invention, the switch 118 is a roaming STP in VPMN 104.

The traffic corresponding to roaming mobile station 106 is redirected by an operator in HMPN 102 in order to steer roaming mobile station 106 to a "preferred" (or even a "non-preferred") network operator in VPMN 104. In other words, traffic redirection (TR) is preformed by an operator in HPMN 102 to redirect the traffic of roaming mobile station 106 to some other network operator in VPMN 104 even though the operator in HPMN 102 may have roaming relationship with barred operator in VPMN 104. The steering of roaming mobile station 106 deprives the barred operators in VPMN 104 of the revenues from the inbound roamer. The system 100 includes an anti-TR module 120 that monitors the traffic between HPMN 102 and VPMN 104 to detect the TR attempt and thereafter provide necessary messages to thwart the detected TR attempt. In one embodiment of the invention, anti-TR module 120 is deployed by these barred (or deprived) operators in VPMN 104 to counter the TR attempt being attempted by the operator in HPMN 102. The anti-TR module 120 includes a TR probe 122 and an anti-TR unit 124. In one embodiment of the invention, anti-TR module 120 monitors the signals exchanged between switch 118 and international STP 1 112 in VPMN 104. This is referred to as passive monitoring. In another embodiment of the invention, anti-TR module 120 actively intercepts the signaling from switch (or roaming STP) 118. Further, switch 118 is configured to assist in exchange of the at least one registration message and the one or more registration response messages between HPMN 102, and anti-TR unit 124 and TR probe 122. Hence, the monitoring or probing of the TR attempt by the TR probe 122 within the anti-TR module 120 is performed in two modes, either by passive monitoring or active monitoring the signaling between HPMN 102 and VPMN 104. Both the modes are explained in conjunction with FIG. 2, and FIGS. 3 and 4 respectively.

System for Detection of HPMN TR

In another embodiment of the invention, TR probe 122 detects a TR attempt by checking receipt of at least one of one or more error messages and one or more success messages from the HPMN in response to the one or more registration response messages from VPMN 104. TR probe 122 may receive only error messages (e.g. LU ACK error messages) from the HPMN GT (Gateway) for all the LU (Location Update) messages sent by VPMN 104. In this case, TR probe 122 can deduce that HPMN 104 is doing TR toward VPMN 104. In another embodiment of the invention, TR probe 122 receives a LU ACK error message (e.g. system failure, unexpected data value, abort, missing data parameter etc) to each of four consecutive LU messages from VPMN 104 on the same HPMN inbound roamer (i.e., the roaming mobile station 106). In this case, TR probe 122 can infer that HPMN 102 is doing TR against VPMN 104.

In yet another embodiment of the invention, TR probe 122 receives the error messages of "Roaming Not Allowed" or "Roaming Restricted due to unsupported feature" or "Roaming restricted due to Regional Subscription" on a HPMN roamer the first N (e.g. N=1) times but not the next time. It can infer that HPMN 102 is attempting TR against VPMN 104. In yet another embodiment of the invention, TR probe 122 receives the error messages and success messages (e.g. LU ACK message) intermittently on the same HPMN inbound roamer within a configurable interval of time (T). In one embodiment of the invention, T is 24 hour period. In this case also, TR probe 122 infers the TR attempt by HPMN 102. In yet another embodiment of the invention, TR probe 122 detects the TR attempt in case the ratio of the error messages to the success messages is greater than a configurable threshold (TS). An exemplary value of TS is 10 percent.

Monitoring Mode Anti-TR

Figure 2:
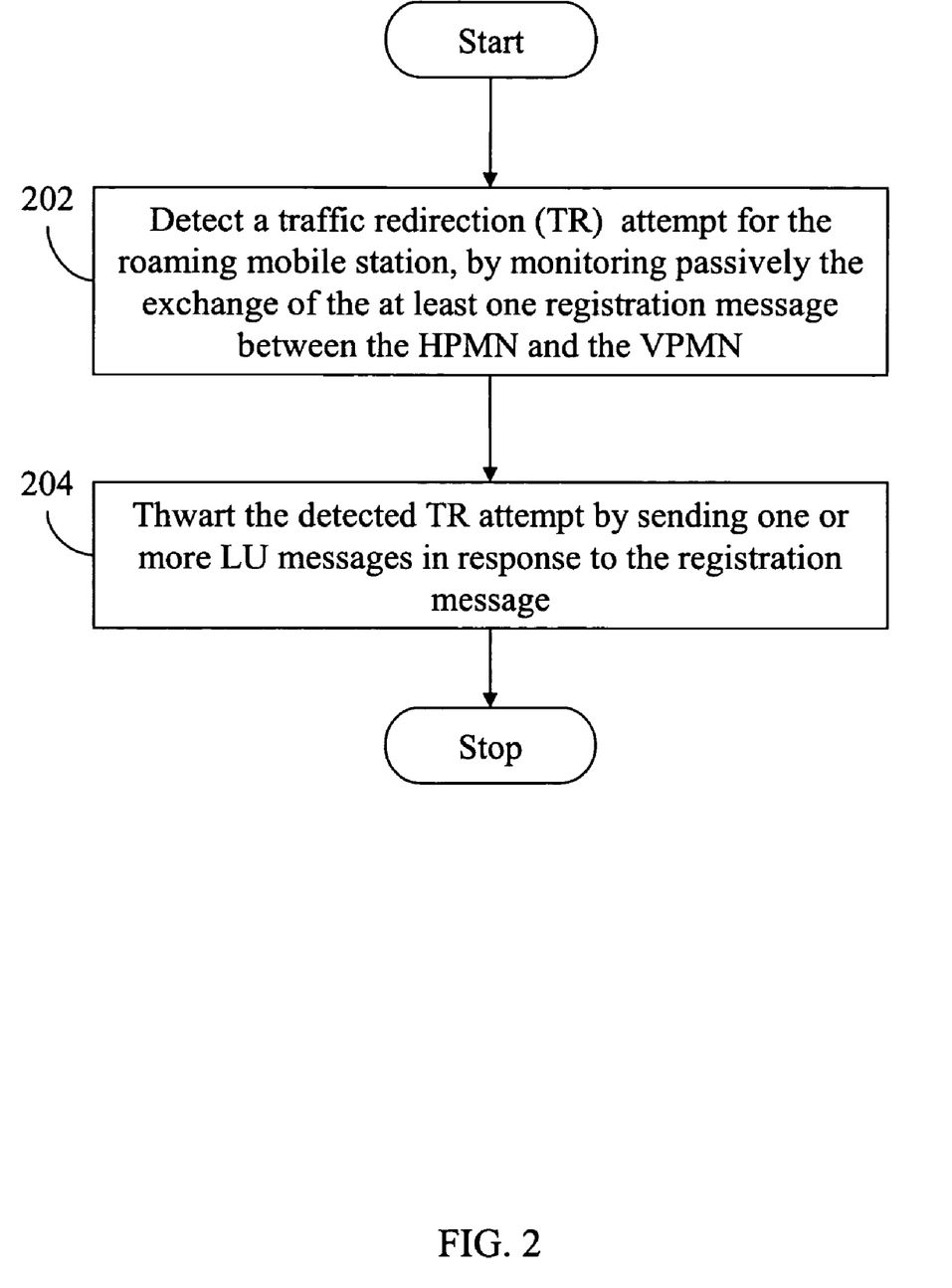
FIG. 2 represents a flowchart for a method for controlling traffic between the HPMN and the VPMN of a roaming mobile station, in accordance with an embodiment of the invention.

FIG. 2 represents a flowchart for a method for controlling traffic between HPMN 102 and VPMN 104 of the roaming mobile station 106, in accordance with an embodiment of the invention. In this embodiment of the invention, anti-TR module 120 detects the TR attempt by monitoring passively (monitoring mode) the signaling between HPMN 102 and VPMN 104. At step 202, the TR attempt for the roaming mobile station 106 is detected by anti-TR module 120, by monitoring passively the exchange of at least one registration message between HPMN 102 and VPMN 104. In one embodiment of the invention, TR probe 122 detects the TR attempt, by observing the exchange of the at least one registration message between HPMN 102 and VPMN 104. In this embodiment of the invention, the at least one registration message is a LU reject message sent by HPMN 102 to initiate the TR attempt. The LU reject message may contain either a TR reject error or an abort message. The LU reject message is a MAP based signaling message, which is detected by anti-TR module 120. The LU reject message is sent by HPMN 102 to initiate the TR attempt for roaming mobile station 106.

At step 204, anti-TR module 120 sends one or more LU messages on the same roamer in response to the LU reject message on a roamer (i.e., the roaming mobile station 106) to thwart the TR attempt. The one or more LU messages are sent as one or more registration response messages on behalf of roaming mobile station 106. In one embodiment of the invention, anti-TR unit 124 thwarts the TR attempt by sending one or more registration response messages in response to the at least one registration message received from the switch 118. The one or more LU messages are sent to HPMN 102 greater than an expected number of times. In one embodiment of the invention, the expected number of times is four. A roaming mobile station sends four LU messages corresponding to a VPMN before it tries for an alternative VPMN. Hence in order to thwart the TR attempt by HPMN 102, anti-TR unit 124 sends three LU message on behalf of roaming mobile station 106 to HPMN 102. These LU messages are fake LU messages and are sent after roaming mobile station 106 sends first LU message. Thereafter, roaming mobile station 106 sends a second LU message making the total of LU messages sent at HPMN 102 equal to five. Hence, HPMN 102 is forced to assume that roaming mobile station 106 is in either a manual mode or there is no other operator in the country of VPMN 104 to which roaming mobile station 106 can connect. As a result of this attempt, HPMN 102 grants connectivity to roaming mobile station 106 with VPMN 104.

The signaling overhead by anti-TR module 120 is generally only one more transaction consisting of a LU message and its corresponding LU reject message. This is insignificant as compared to a complete location update including a MAP LUP and MAP ISD request and their responses. Hence, this also reduces the signaling between HPMN and VPMN. In one embodiment of the invention, anti-TR unit 124 sends one fake LU message on behalf of roaming mobile station 106 so to let roaming mobile station 106 send the rest of LU messages on its own. In this embodiment of the invention, anti-TR unit 124 sends the subsequent fake LU messages at a configurable interval of time after first TR attempt is detected by TR probe 122. The fake LU message can be sent between any two TR rejects corresponding to LU messages from roaming mobile station 106. This is done in order to counter an anti-TR detection (or defense) system at HPMN 102. Further, this approach also forces HPMN 102 to perceive roaming mobile station 106 as a special handset and hence granting connectivity.

In-Signaling Mode Anti-TR

Figure 3:
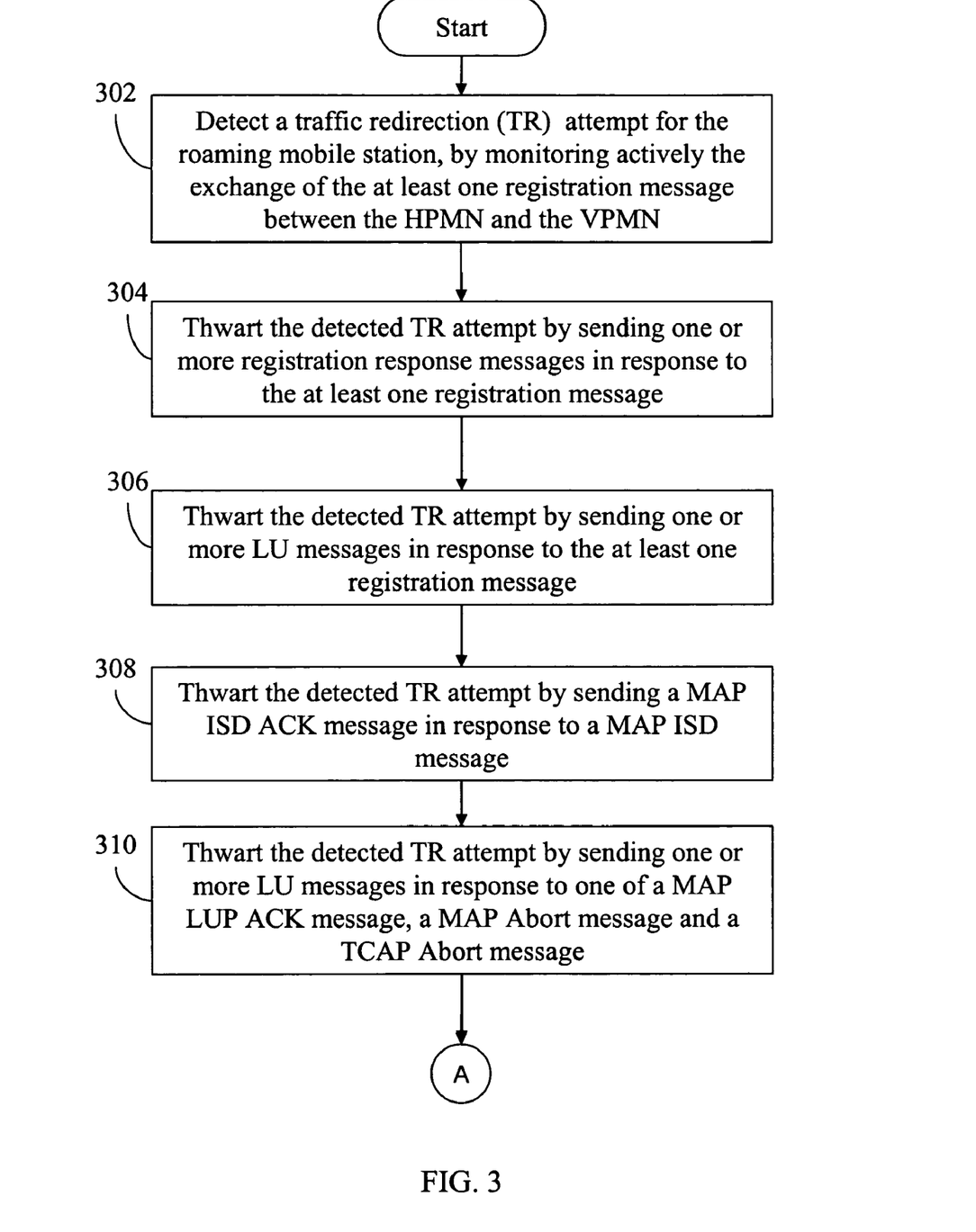
FIGS. 3 and 4 represent a flowchart for a method for controlling traffic between the HPMN and the VPMN of a roaming mobile station, in accordance with another embodiment of the invention.
Figure 4:
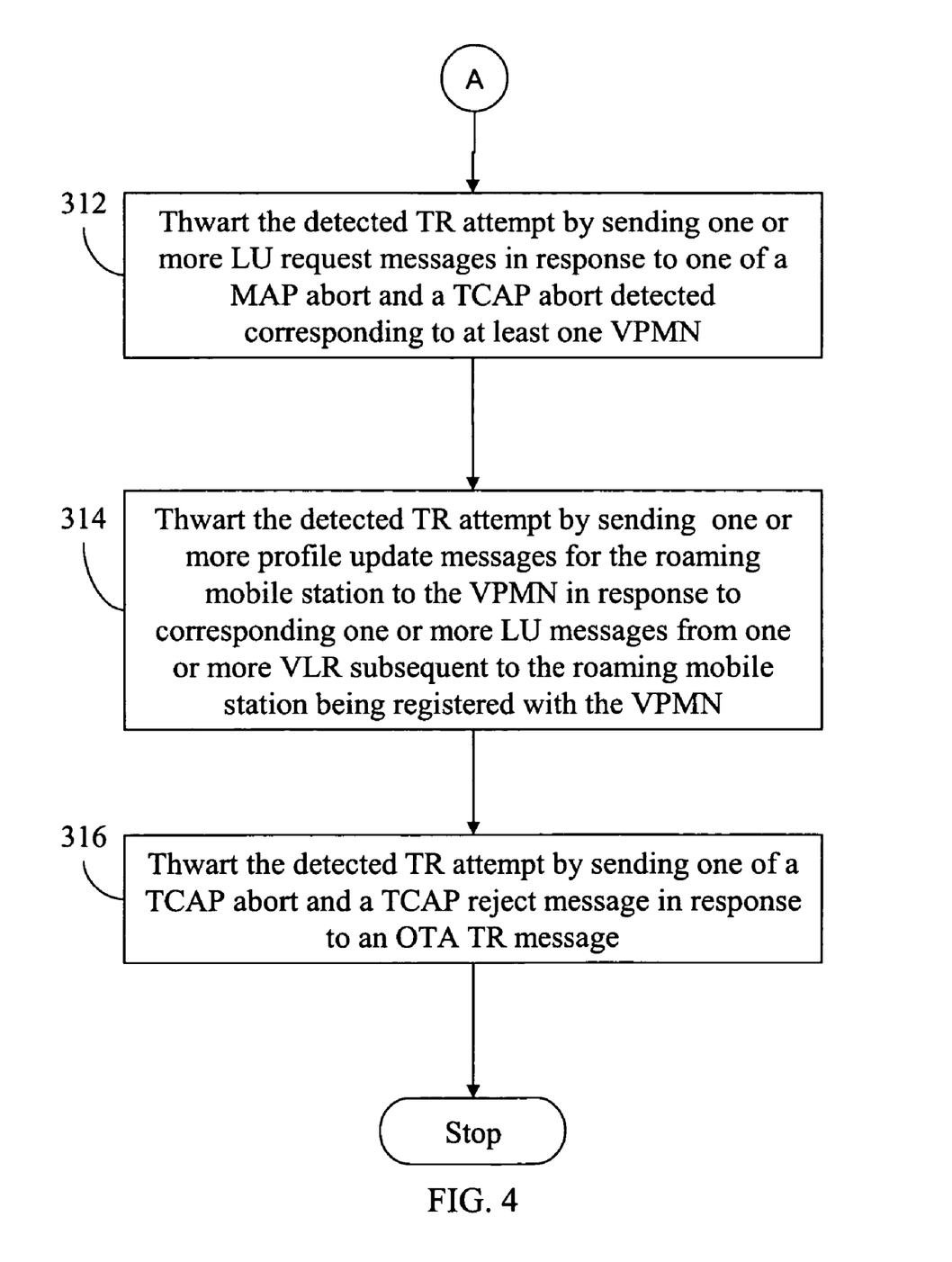

FIGS. 3 and 4 represent a flowchart for a method for controlling traffic between HPMN 102 and VPMN 104 of the roaming mobile station 106, in accordance with an embodiment of the invention. In this embodiment of the invention, anti-TR module 120 detects the TR attempt by actively monitoring the signaling between HPMN 102 and VPMN 104. At step 302, the TR attempt for the roaming mobile station 106 is detected by anti-TR module 120, by monitoring actively the exchange of at least one registration message between HPMN 102 and VPMN 104. Active monitoring is hereinafter referred interchangeably as in-signaling mode. In the in-signaling mode anti-TR module 120 is deployed on roaming SS7 path by configuring VPMN's 104 switch 118 (or roaming STP) to route international roaming SCCP traffic through anti-TR module 120. In other words, switch 118 is configured to assist in exchange of the at least one registration message and the one or more registration response messages between HPMN 102 and anti-TR unit 124.

At step 304, anti-TR module 120 sends the one or more registration response messages on behalf of roaming mobile station 106 to thwart the TR attempt. In one embodiment of the invention, anti-TR unit 124 thwarts the TR attempt by sending one or more registration response messages in response to the at least one registration message received from the switch 118. In an exemplary routing, primary routing of the incoming international SCCP traffic destined to VPMN's 104 E164 VPMN VLR 108 is configured to go through anti-TR module 120. However, secondary routing is kept to VPMN VLR 108. This is done in order to provide a redundant path for routing of traffic in case of failure of anti-TR module 120. Similarly, primary routing of any outgoing international SCCP traffic destined to HPMN's 102 E214 address of HPMN HLR 110 is configured to go through anti-TR module 120. The secondary routing however goes to international STP 2 114. It will be apparent to a person skilled in the art, that different routing methods can be used without affecting the working of the system or the method. Another routing technique is described in conjunction with FIG. 5.

The E214 is a numbering plan (NP) used for delivering mobility management related messages in GSM networks. The E.214 number is derived from the IMSI of a roaming mobile station. E.214 numbers are composed of two parts. The first, the E.164 part, is made up of a country code followed by the network code. The second part of the number is made from the MSIN part of the IMSI which identifies an individual subscriber. E.214 numbers are routed separately from E.164 numbers since they are marked with a different Numbering Plan Indicator (NPI), however, it is possible to reuse Global Title (GT) analysis tables used in E.164 numbers everywhere except for the final destination network of the message.

Anti-TR Routing Using TT

In case addresses of VPMN VLR and VMSC are same, SSN can be used to separate the routing. It will be apparent to a person skilled in the art that alternative routing options are possible depending on type of network in VPMN 104. For example, to avoid looping the traffic redirection can be performed either using translation tables (TT) or using MTP routing involving international STP as DPC, depending on the network setup in VPMN 104. Referring back to FIG. 1, and considering the former technique of using the TT, the switch 118 and the anti-TR module 120 are configured for both incoming and outgoing international SCCP signaling messages. For example, in case of an incoming message at the switch 118 with TT as 0, Called party (CdPA) is not own and the NP is E.214, the DPC is set as anti-TR module 120. Similarly, in case the CdPA is VPMN VLR 108 with TT as 0, the DPC is set to be anti-TR module 120. This means any incoming E164 message at the switch 118 is directed to the anti-TR module 120 first. In case of an outgoing message from the switch 118 with the TT as 32 and CdPA is not own and the NP is E.214, the DPC is set as international STP 1 112. Further, in case with TT as 32 and CdPA as VPMN VLR 108, the DPC is also set to VPMN VLR 108. This implies that any outgoing message from the switch 118 and received from anti-TR module 120 (since TT is 32) is directed to the address in the CdPA. Further, any outgoing message from anti-TR module 120 using TT as 32, has its DPC set as the switch 118. The routing indicator (RI) in all these cases is the GT of the VPMN VLR and/or VMSC.

Anti-TR Routing Without Using TT

Considering the second technique of using MTP routing, switch 118 is configured to send an incoming message with NP as E.214 and CdPA as not own to DPC at anti-TR module 120. Also in case the CdPA is VPMN VLR 108 the DPC is changed to anti-TR module 120. Hence, any incoming message at the switch 118 is sent to anti-TR module 120. Routing configuration for an incoming message at anti-TR module 120 sets the DPC to VPMN VLR 108 with RI as SSN/unchanged. Similarly, for an outgoing message from anti-TR module 120, the DPC is set to international STP 1 112 with RI as GT. Based on different incoming and outgoing messages from switch 118, the anti-TT module 120 sends different messages as one or more registration response messages to thwart the TR attempt.

Detecting HPMN TR

In one embodiment of the invention, the TR attempt, by the HPMN 102, is detected by checking receipt of one or more error messages and/or one or more success messages from the HPMN in response to one or more registration response messages. The error messages are LU reject message sent by the HPMN 102 in response to the LU messages sent by anti-TR module 120. Similarly, one or more success messages are LU ACK messages sent by HPMN 102 in response to the LU messages sent by anti-TR module 120. The anti-TR module 120 can also detect the TR attempt in case the LU ACK error messages (e.g. system failure, unexpected data value, abort, missing data parameters etc) are sent to each of the four consecutive LU messages on the same HPMN roamer (i.e., the roaming mobile station 106). The anti-TR module 120 can also detect the TR attempt in case it is observed that a HPMN GT only returns LUP ACK error but never success to any roamer. The anti-TR module 120 can also detect the TR attempt in case the error message of "roaming not allowed" or "roaming restricted due to unsupported feature" or "Roaming restricted due to regional subscription" is sent the first N times (e.g. N=1) but not the next time to a LU message on the same HPMN roamer from the VPMN. The anti-TR module 120 can also detect the TR attempt in case the error messages and the success messages on a same roamer are received intermittently within a configurable interval of time (T). In one embodiment of the invention, T is 24 hour period. Further, anti-TR module 120 can also detect the TR attempt in case the ratio of error messages to the success messages from HPMN 102 exceeds a configurable threshold (TS). An exemplary value of TS is 10 percent. It will be apparent to person skilled in the art that the embodiments for detecting the HPMN TR are applicable in both monitoring mode and in-signaling mode.

The method steps from 306 to 314 represent various embodiments for thwarting the TR attempt by anti-TR module 120 based on different messages received from switch 118. It may be appreciated by a person skilled in the art, that one or more of the above method steps (306 to 314) may be executed either independent of each other or in any combination whatsoever to thwart the TR attempt.

Defeating HPMN TR

In one embodiment of the invention in active monitoring mode, at step 306, anti-TR module 120 thwarts the detected TR attempt by sending one or LU messages on behalf of roaming mobile station 106 to switch 118, which relays those messages to HPMN 102. The one or more LU messages are sent in response to at least one LU reject message (received as the at least one registration message) received from HPMN 102 and relayed though switch 118 (i.e., the roaming STP in VPMN 104). The one or more LU messages force HPMN HLR 110 to perceive that roaming mobile station 106 is either a special handset or a handset in manual mode. This is achieved by either sending the LU messages at a configurable interval of time or by sending the LU messages more than an expected number of times (e.g. four times).

In another embodiment of the invention in active monitoring mode, at step 308, anti-TR module 120 thwarts the detected TR attempt by sending a MAP ISD ACK message in response to a MAP ISD message. In case any outgoing SCCP message carries a MAP LUP message, its SCCP and TCAP parameters are recorded by anti-TR module 120. Thereafter, if the incoming SSCP message carries a MAP ISD message with a recorded transaction, it is first accumulatively recorded with the earlier recorded MAP LUP message and then examined with logic procedure stored in anti-TR module 120. If the MAP ISD message contains Roaming Restricted (RR) (due to unsupported feature or due to regional subscription) for less than a configurable number (K) of times for the same transaction, then anti-TR module 120 rejects by sending MAP ISD ACK message with any error such as unexpected data value or service is not supported or TCAP-aborted or any combination thereof. An exemplary value of the configurable number of time K is two. Hence the HPMN is forced to believe that current network in VPMN 104 may be the only network available with coverage or roaming mobile station 106 is in a manual mode. In another case, if the MAP ISD message contains a Roaming Not Allowed (RNA) in ODB for less than a configurable number (L) of times for the same transaction, it is rejected by anti-TR module 120 in its MAP ISD ACK message. An exemplary value of the configurable number of time L is two. Again, the HPMN is forced to believe that roaming mobile station 106 is in manual mode.

In yet another embodiment of the invention in active monitoring node, at step 310, anti-TR module 120 thwarts the TR attempt by sending one or more LU messages in response to a MAP LUP ACK message, a MAP Abort message or a TCAP Abort message received from switch 118. In first case, when the incoming SCCP message carries a MAP LUP ACK message with response to a recorded transaction, it is examined with following set of logic procedures. In case MAP LUP ACK message contains an error such as system failure, unexpected data value or missing data for the same IMSI of same originating transaction ID from the same VLR/VMSC for less than a configurable number N (e.g. N=5) of times, the following a sequence of actions could be performed.

The anti-TR module 120 drops the MAP LUP ACK message, i.e., it doesn't send the message to VPMN VLR 108 (or relay the message to VPMN VLR 108). Thereafter, either after a configurable interval T1, anti-TR module 120 initiates another LU message on behalf of roaming mobile station's 106 IMSI using same parameters (including same VLR., VMSC address, SCCP•CgPA and CdPA although different TCAP transaction Ids may be used) as the recorded LU message. In an exemplary embodiment, the value of T1 is kept random (e.g. T1=0s or T1=50s or T1=300s), to avoid being detected by HPMN TR. Further, in a different case, anti-TR module 120 drop next (one or more) LU messages from roaming mobile station's 106 IMSI from the same location (VLRNMSR), i.e., doesn't sends it to HPMN 102, so to make the HPMN believe that the handset is a special handset because inter-location update interval of same network is taking too long. Yet in another case, if the current TR reject is fourth time including two times for LU messages initiated by anti-TR module 120, then it drops the next location update from the roaming mobile station's IMSI from the same location (VLR/VMSR), so to makes HPMN 102 believe that the handset is a special handset because inter-network location update interval is too long.

In another case, if the MAP LUP ACK message contains an error such as Roaming Not Allowed (RNA) for a configurable number X (e.g. X=2) of times, then the following a sequence of actions could be performed. The anti-TR module 120 drops the MAP LUP ACK message i.e. it doesn't send the message to VPMN VLR 108 (or relay the message to VPMN VLR 108). Further, after a configurable interval T2, anti-TR module 120 initiates another LU message on behalf of roaming mobile station's 106 IMSI using same parameters (including same VLR., VMSC address, SCCP CgPA and CdPA although different TCAP transaction IDs might be used) as the recorded Location Update. In an exemplary embodiment, the value of T2 is kept random (e.g. T2=0s or T2=50s or T2=300s), to avoid being detected by the HPMN TR.

However, in case the incoming SCCP message is the MAP Abort or TAP Abort message with response to the recorded transaction, it is examined with following set of logic procedures. If the abort message for roaming mobile station's 106 IMSI of the same originating transaction ID from VPMN VLR 108 for less than a configurable N (e.g. N=5) number of times, the following sequence of actions could be performed. The anti-TR module 120 drops the abort message (i.e. it doesn't send the message to VPMN VLR 108) or relay the message to VPMN VLR 108. Thereafter, after the configurable interval T1 e.g. T1=0s or T1=50s or T1=300s), anti-TR module 120 initiates another LU message on behalf of roaming mobile station's 106 IMSI using same parameters (including same VLR., VMSC address, SCCP CgPA and CdPA although different TCAP transaction IDs might be used) as the recorded LU message.

In case when none of the above conditions are satisfied, then all incoming SCCP messages may be relayed back to switch 118 (or the roaming STP) or VPMN VLR 108 respectively depending on whether the TT type or MTP routing is used. In the above described methods, SCCP is relayed rather than TCAP. However, it will be apparent to a person skilled in the art, that a similar flow can also be defined for TCAP based relay. In this case, new transaction will be initiated by anti-TR module 120 for each self-initiated LU message and each time a new mapping will be related the new originating transaction ID to the original originating transaction ID.

The error messages received in incoming SCCP messages on the error interface are mapped onto equivalent messages on the radio interface according to 3 GPP 29010. Table 1 shows a snapshot of the mapping of some of these messages from the error interface (29.002) to the radio interface (24.008) with corresponding error codes for each interface.

action are recorded. Further, in case the incoming message carries the MAP abort or the TCAP abort or system failure with response to the recorded transaction, it is examined with following set of logic procedures.

One embodiment is to have the abort message dropped by anti-TR module 120 if the abort or system failure message for roaming mobile station's 106 IMSI of the same originating transaction ID from the same VLR for less than a configurable Z number of times. The configurable number Z is ((N−1)*4+1), where N is configured from a minimum two to the total number of network operators in that country. Thereafter for each drop, the anti-TR module 120 initiates another LU message after a configurable interval T1 of time on behalf of roaming mobile station's IMSI using same parameters (including same VLR., VMSC address, SCCP CgPA and CdPA although different TCAP transaction Ids might be used) as the first recorded LU message. This foils any TR attempt by any other VPMN operator on its inbound roamer, i.e., roaming mobile station 106.

Another embodiment is to have the abort message follow its normal path to the VLR. But anti-TR module 120 will issue LU messages for a configurable number Z=((N−1)*4+1), where N is configured from a minimum two to the total number of network operators in that country on behalf of roaming mobile station's IMSI using same parameters (including same VLR., VMSC address, SCCP CgPA and CdPA although different TCAP transaction Ids might be used) as the

TABLE 1

| Error code | 24.008 MM (Location Updating Reject) | 29.002 MAP Update Location response | Error code |
|---|---|---|---|
| # 2 | IMSI unknown in HLR | Unknown subscriber | # 1 |
| # 11 | PLMN not allowed | Roaming not allowed: PLMN not allowed | # 8 |
| # 12 | LA not allowed | — | |
| # 13 | Roaming not allowed in this LA | — | |
| # 15 | No suitable cells in location area | — | |
| # 11 | PLMN not allowed | Operator determined barring | # 8 |
| # 3 | Illegal MS | — | |
| # 6 | Illegal ME | — | |
| # 17 | Network failure | System Failure | # 34 |
| # 17 | Network failure | Unexpected data value | # 36 |
| # 17 | Network failure | MAP U/P ABORT | |
| # 17 | Network failure | MAP_NOTICE | |
| # 17 | Network failure | MAP_CLOSE | |

For example, in case, the error in error interface "System Failure" (with error code 34) (29.002), then its equivalent error on the radio interface (24.008) "is "Network Failure" (error code 17), and received at roaming mobile station 106, and roaming mobile station 106 waits for around 20 or 15 seconds before another try. Similarly, other 24.008 error messages have their equivalent 29.002 error messages.

Defeating VPMN Inbound TR

In yet another embodiment of the invention in active/passive monitoring node, at step 312, anti-TR module 120 thwarts the TR attempt by sending one or more LU request messages in response to either a MAP abort or a TCAP abort detected corresponding to at least one VPMN. In this embodiment of the invention, a competing operator in VPMN 104 attempts for TR to steer the traffic of inbound roamer to its own network. The anti-TR module 120 checks whether any outgoing SCCP message carries MAP LUP message, upon detection of which the SCCP, TCAP parameters and the transfirst recorded LU message. This foils any TR attempt by any other VPMN operator on its inbound roamer, i.e., roaming mobile station 106.

In case when the above conditions are not satisfied, then all incoming SCCP messages may be relayed back to switch 118 (or the roaming STP) or VPMN VLR 108 respectively depending on whether the TT type or MTP routing is used. In the above described method, SCCP is relayed rather than TCAP. However, it will be apparent to a person skilled in the art, that a similar flow can also be defined based TCAP relay. In this case, new transaction will be initiated by anti-TR module 120 for each self-initiated LU message and each time a new mapping will be related the new originating transaction ID to the original originating transaction ID.

Assisting HPMN TR

In another embodiment of the invention, anti-TR module 120 sends one or more registration response messages within the VPMN on behalf on the HPMN and in response to receipt of the at least one registration message sent by the HPMN. In doing so, anti-TR module 120 assists HPMN in the TR attempt by reducing signaling overhead between HPMN 102 and VPMN 104. Anti-TR module 120 sends messages on behalf of HPMN 102 to reduce the actual signaling between HPMN 102 and VPMN 104 based on a set of logic procedures.

In case the outgoing SCCP message carries a MAP LUP message, the TCAP and SCCP parameter and transaction are recorded. If the outgoing message is the first LUP message for an IMSI (or roaming mobile station 106) in VPMN 104 or if this is the first LUP message for an IMSI after the IMSI is registered with the VPMN previously, then anti-TR module 120 performs "no-action" on behalf of HPMN 102. Otherwise, if corresponding configured limit for the action is not exceeded, anti-TR module 120 will not relay the message to the HPMN (on behalf of HPMN 102) to reduce signaling overhead between VPMN 104 and HPMN 102. Further, if the incoming SCCP message carries a MAP ISD message of a recorded transaction, it is first accumulatively recorded (including SCCP and TCAP parameters) with the early recorded LUP transaction and it is then examined with the a new set of logic procedures. Anti-TR module 120 checks if the ISD contains RR (Roaming Restricted), then on behalf of HPMN 102, anti-TR module 120 itself issues "RR" to the VPMN 104. In this exemplary case, the configurable limit for this action can be 1. Similarly, if the ISD contains RNA (Roaming Not Allowed) in ODB, then on behalf of HPMN 102, anti-TR module 120 itself issues RR to the VPMN 104. In this exemplary case, the configurable limit for this action can be 1.

However, if the incoming SCCP message carries a MAP LUP ACK message, anti-TR module 120 examines it using following logic. If the LUP ACK message contains any error code as system failure, unexpected data value or missing data for the same IMSI (i.e., roaming mobile station 106) of the same originating transaction ID from the same VLR/VMSC, then on behalf of HPMN 102, anti-TR module 120 itself issues "error-code" to the VPMN 104. In this exemplary case, the configurable limit for this action can be 3. Similarly, if the LUP ACK message contains the error code RNA, then on behalf of HPMN 102, anti-TR module 120 itself issues "RNA". In this exemplary case, the configurable limit for this action can be 1. Moreover, if the incoming SCCP message carries a MAP Abort or TCAP Abort message, then on behalf of HPMN 102, anti-TR module 120 itself issues "Abort". In this exemplary case, the configurable limit for this action can be 3.

Avoiding HPMN TR by Using GLR

In yet another embodiment of the invention in active monitoring (i.e., in-signaling path) node, at step 314, the TR attempt of HPMN 102 is thwarted by sending by one or more profile update messages for roaming mobile station 106 to VPMN 104 in response to corresponding one or more LU messages from one or more VLR after the roaming mobile station is registered with VPMN 104. In this embodiment a GLR is deployed in VPMN 104 to thwart the HPMN TR attempt. The GLR is a node between VPMN VLR 108 and the HPMN HLR 110, which may be used to optimize the location updating and the handling of subscriber profile data across network boundaries. When a subscriber is roaming the GLR plays the role of the HLR towards the VLR in VPMN 104 and the role of the VLR towards the HLR in HPMN 102. In other words, the GLR act as VPMN VLR 108 to HPMN HLR 110 and acts as HPMN HLR 110 to VPMN VLR 108. In general it relays the first LU message from an inbound roamer (roaming mobile station 106) to HPMN HLR 110 and stores subscriber data profiles. In case the roaming mobile station 106 is moving around in the VPMN 104 under different VLRs/VMSCs, for any subsequent inter-VLR location updates, the GLR sends the profile data itself without relaying location update to HPMN HLR 110 and hence avoiding TR attempt by HPMN 102. To avoid being detected by the HPMN TR, the GLR randomly chooses to do location update on a roamer for subsequent location update even though a subscriber profile is already stored locally. In another embodiment of the invention, the GLR is integrated with anti-TR module 120.

Defeating OTA Based TR

In another embodiment of the invention in active monitoring (i.e., in-signaling path) node, at step 314, anti-TR module thwarts the TR attempt by sending either a TCAP abort or a TCAP reject message in response to an OTA TR message. In this case, HPMN 102 tries a TR attempt sending an OTA message, which may be an SMS. Anti-TR module 120 checks whether the OTA TR message can influence network reselection. If the OTA TR message is for TR attempt, anti-TR module 120 sends the TCAP reject message with any error, such as, service/facility not supported, or unexpected data value, or system failure, or resource limitation and the like. In another case, anti-TR module 120 sends the TCAP abort with unknown cause or with causes such as, "badly Formatted Transaction Portion", "incorrect Transaction Portion", or "resource Limitation" or any combination thereof. Alternatively, anti-TR module 120 can just acknowledge success of the OTA TR message to HPMN 102 when in fact it drops the message, i.e. it doesn't relay the HPMN OTA TR message to the VMSC VLR 108 in VPMN 104.

In order to detect whether a SCCP message is an OTA TR message or not, the message needs first be recognized as a MAP MT/Fwd SMS. Second, the SM-RP-UI (Short Message-Relay Protocol-User Indicator) of the SMS message needs then be recognized to have SIM Data Download as its protocol ID and to have the UDHI (User Data Header Indicator) field. The SM-RP-UI parameter represents the user data field carried by the SMS message relay sub-layer protocol. SIM Data download is a facility whereby a ME must pass the short message in its entirety including all SMS elements contained in the SMS deliver to the SIM using the mechanism described in GSM 11.11. The DCS (Data Coding Scheme) shall be set to 8 bit message class 2 (either bit coding 1111 0110 or 00010110). The entire user data field is available for SIM Data download. Hence, anti-TR module 120 excludes the OTA TR messages intended for the handset, e.g. WAP and MMS configurations are allowed. The SMS message content if unencrypted is digested to see if it contains any OTA user data. If it does, as a next step it is checked if the user data contains modification of network selection related files. These files may include preferred PLMN list, last registered network and the like. These parameters can be dynamically controlled via configurations. The modifications in the data can be passed to a STK application. Since most OTA messages are encrypted based on GSM 348, it can be checked if the SMS-RP-UI UDH part of the SMS message contains some of the parameters in the command header as defined in GSM 348 (an extract is shown in the Table 2).

TABLE 2

| Element | Length | Comment |
| --- | --- | --- |
| Command Packet Identifier (CPI) | 1 octet | Identifies that this data block is the secured Command Packet. |
| Command Packet Length (CPL) | variable | This shall indicate the number of octets from and including the Command Header Identifier to the end of the Secured Data, including any padding octets. |
| Command Header Identifier (CHI) | 1 octet | Identifies the Command Header. |
| Command Header Length (CHL) | variable | This shall indicate the number of octets from and including the SPI to the end of the RC/CC/DS. |
| Security Parameter Indicator (SPI) | 2 octets | see detailed coding in section 5.1.1. |
| Ciphering Key Identifier (KIc) | 1 octet | Key and algorithm Identifier for ciphering. |
| Key Identifier (KID) | 1 octet | Key and algorithm Identifier for RC/CC/DS. |
| Toolkit Application Reference (TAR) | 3 octets | Coding is application dependent. |
| Counter (CNTR) | 5 octets | Replay detection and Sequence Integrity counter. |
| Padding counter (PCNTR) | 1 octet | This indicates the number of padding octets at the end of the secured data. |
| Redundancy Check (RC), Cryptographic Checksum (CC) or Digital Signature (DS) | variable | Length depends on the algorithm. A typical value is 8 octets if used, and for a DS could be 48 or more octets; the minimum should be 4 octets. |
| Secured Data | variable | Contains the Secured Application Message and possibly padding octets. |

For example, if the SMS-RP-UI UDHI part of the SMS message contains a command packet identifier or command identifier, it can be treated as an OTA message for a SIM resident application. If the Toolkit Application Reference in the GSM 348 encoded command header of the SMS UDH field is recognized as a TR application based on some intelligent logics, then the SMS message can be more accurately identified as a TR related OTA message. Some exemplary intelligent logics can be learning from the operator that has deployed OTA-based TR or internal tests to see if the messages have moved networks for a roaming handset.

According to GSM 348,

Quote:

If a Command Packet is longer than 140 octets (including the Command Header), it shall be concatenated according to GSM 03.40. In this case, the entire Command Packet including the Command Header shall be assembled, and then separated into its component concatenated parts. The first Short Message shall contain the concatenation User Data Header and the Command Packet Identifier in the UDH in no particular order. Subsequent Short Messages shall contain only the concatenation User Data Header. The concatenation Header contains a Reference number that will allow the Receiving Entity to link individual Short Messages together to re-assemble the original Command Packet before unpacking the Command Packet.

Unquote

This means that when anti-TR module 120 has detected a first OTA TR message that is concatenable, anti-TR module 120 waits for subsequent OTA TR message of the same reference number to reconstruct the whole message before deciding any action to be taken. Alternatively, a rule can be applied to treat any SMS message as OTA TR message if they have protocol ID as SIM data download and have UDHI. However, this rule is less than ideal in case when the home operator has some STK application not intended for TR, e.g. call management application, in the SIM that depends on some SIM data download from the home operator when the ME is roaming.

OTA Based Anti-TR Without Using TT

The routing of the OTA based messages can also be performed using two techniques, i.e., the TT based and the MTP routing (or without using TT). Referring back to FIG. 1 and considering the TT based. The switch 118 and anti-TR module 120 are configured for both incoming and outgoing OTA signaling messages. For example, in case of an incoming message at the switch 118 with TT as 0, Called party (CdPA) as VPMN VMSC, CgPA as OTA-offending HPMN CC NDC and the NP is E.164, then the DPC is set as anti-TR module 120. Similarly, in case the CdPA is VPMN with TT as 32, the DPC is set to be VPMN VLR 108. Further, any outgoing message from anti-TR module 120 using TT as 32, has its DPC set as the switch 118 with RI as GT.

OTA Based Anti-TR Without Using TT

Considering the second technique of using MTP routing (i.e., without using TT), an incoming message at the switch 118 with TT as 0, Called party (CdPA) as VPMN VMSC, CgPA as OTA-offending HPMN CC NDC and the NP is E.164, then the DPC is set as anti-TR module 120. Routing configuration for an incoming message at anti-TR module 120 sets the DPC to VPMN VLR VMSC with RI as SSN/unchanged.

Figure 5:
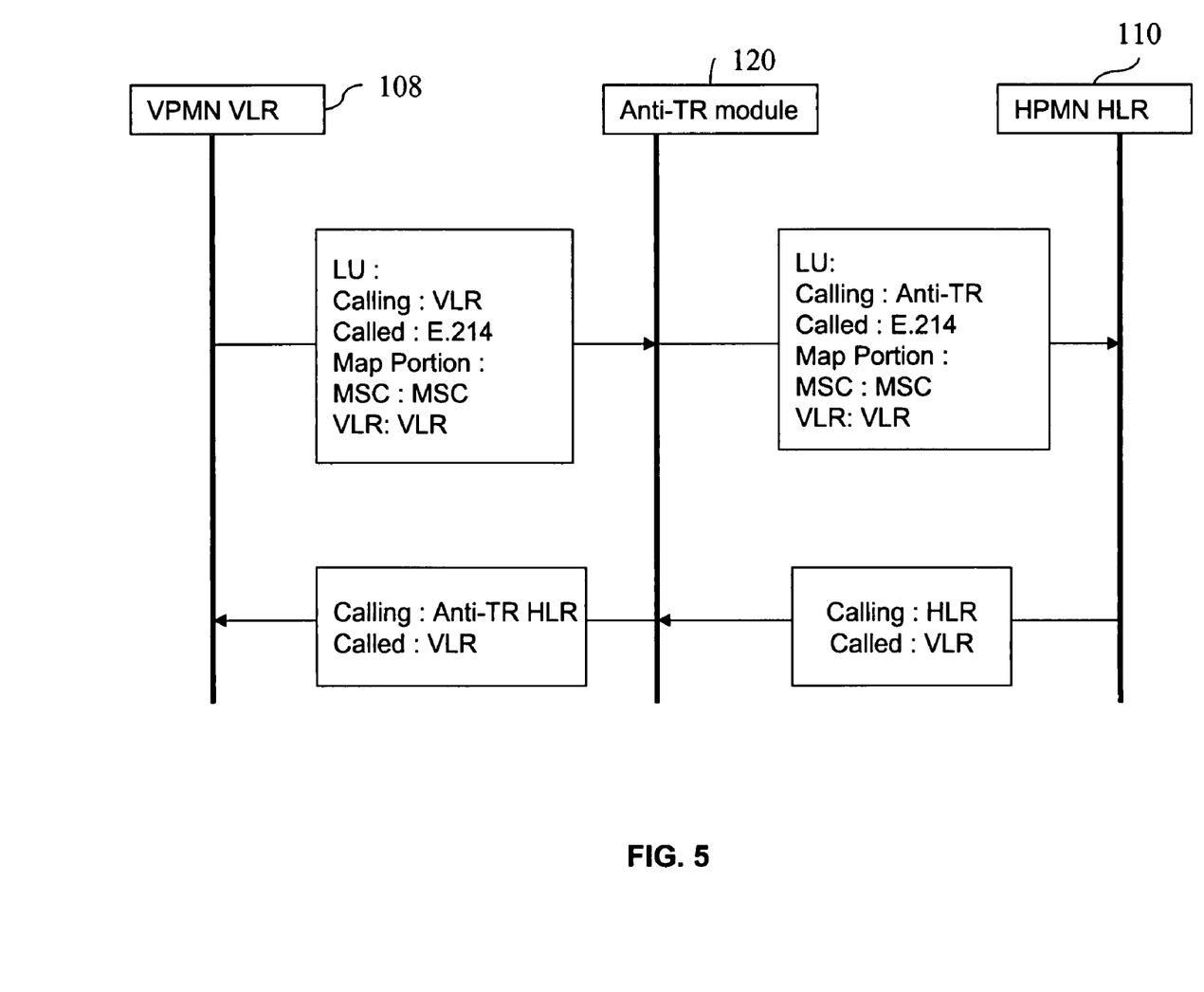
FIG. 5 represents a flow diagram for routing of signaling messages between the VPMN and the HPMN, in accordance with an embodiment of the invention.

FIG. 5 represents a flow diagram for routing of signaling messages between the VPMN 104 and the HPMN 102, in accordance with an embodiment of the invention. This embodiment represents routing of signaling messages between the VPMN VLR 108 (in VPMN 104) and the HPMN HLR 110 (in HPMN 102) via the anti-TR module 120. The outgoing E.214 destined messages are redirected through the anti-TR module 120. However, only incoming anti-TR module destined messages will go through anti-TR module 120. When roaming mobile station's 106 E214 message is routed through anti-TR module 120 to the HPMN HLR 110, the SCCP CgPA is modified to the GT of anti-TR module 120 without changing the VLR parameter. Similarly, for return messages destined to anti-TR module 120, the CgPA is changed to the GT of anti-TR module 120 corresponding to HPMN HLR 110. This routing has the advantage that for all the E.214 messages going through anti-TR module 120 to the HPMN HLR 110, only those related to LU transactions will have return messages routed through anti-TR module 120. Other E.214 messages like activate SS (Supplementary Services), Interrogate SS and the like are bypassed by anti-TR module 120 (i.e., the calling address is left unchanged) and hence the return message will not go through the anti-TR module 120. The further advantage is that for all the incoming international messages going to VPMN VLR 108, only the messages with called address of anti-TR module 120 are routed to anti-TR module 120. Hence unwanted incoming (request or response) messages like MT-Forward SM (if VLR and VMSC are same and SSN could not be used to distinguish VLR/VMSC routing), purge MS, messages that are part of future subscriber transactions (like SS services) will not be routed to anti-TR module 120.

A computer usable medium provided herein includes computer usable program code, which when executed controls traffic between the HPMN and the VPMN of a roaming mobile station by detecting a traffic redirection (TR) attempt for the roaming mobile station. The TR attempt is detected by observing exchange of at least one registration message between the VPMN and the HPMN. The computer usable medium further includes computer usable program code for thwarting the TR attempt.

The Anti-Traffic Redirection System (ATRS) can be used by a VPMN operator against those HPMN operators that turned down the request to disclose that they deploy traffic redirection against the VPMN operator. It can also be cache to roaming profiles of successfully registered inbound roamers so to avoid subsequent traffic redirections by the HPMN operators that have deployed traffic redirection against the VPMN operator. The ATRS can also be used to stop the leaking of inbound roaming traffic to a competing operator doing inbound traffic redirection. Notwithstanding, a counter technique is not applied at a VPMN operator, it is useful to detect if a HPMN operator is doing traffic redirection against the VPMN operator or not. The detection will help the VPMN operator prepare business impact and rescue actions.

The components of ATRS described above include any combination of computing components and devices operating together. The components of the ATRS can also be components or subsystems within a larger computer system or network. The ATRS components can also be coupled with any number of other components (not shown), for example other buses, controllers, memory devices, and data input/output devices, in any number of combinations. In addition any number or combination of other processor based components may be carrying out the functions of the ATRS.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the ATRS is not intended to be exhaustive or to limit the ATRS to the precise form disclosed. While specific embodiments of, and examples for, the ATRS are described herein for illustrative purposes, various equivalent modifications are possible within the scope of the ATRS, as those skilled in the art will recognize. The teachings of the ATRS provided herein can be applied to other processing systems and methods. They may not be limited to the systems and methods described above.

The elements and acts of the various embodiments described above can be combined to provide further embodiments. These and other changes can be made to the ATRS in light of the above detailed description.

Other Variations

Provided above for the edification of those of ordinary skill in the art, and not as a limitation on the scope of the invention, are detailed illustrations of a scheme for controlling traffic between HPMN and VPMN of the roaming mobile station. Numerous variations and modifications within the spirit of the present invention will of course occur to those of ordinary skill in the art in view of the embodiments that have been disclosed. For example the present invention is implemented primarily from the point of view of GSM mobile networks as described in the embodiments. However, notwithstanding, the present invention may also be effectively implemented on CDMA, 3 G, WCDMA, GPRS, WiFi, WiMAX, VOIP etc., or any other network of common carrier telecommunications in which end users are normally configured to operate within a "home" network to which they normally subscribe, but have the capability of also operating on other neighboring networks, which may even be across international borders.

The examples under the present invention Anti-Traffic Redirection System (ATRS) detailed in the illustrative examples contained herein are described using terms and constructs drawn largely from GSM mobile telephony infrastructure. But use of these examples should not be interpreted to limiting the invention to those media. Anti-Traffic Redirection System—a method for controlling traffic between HPMN and VPMN of the roaming mobile station in a manner that is agnostic to the capabilities of the visited or non-accustomed network can be of use and provided through any type of telecommunications medium, including without limitation: (i) any mobile telephony network including without limitation GSM, 3 GSM, 3 G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices, (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the ATRS under the present invention, this specification follows the path of a telecommunications call from a calling party to a called party. For the avoidance of doubt, that call can be for a normal voice call, in which the subscriber telecommunications equipment is also capable of visual, audiovisual or motion-picture display. Alternatively, those devices or calls can be for text, video, pictures or other communicated data.

TECHNICAL REFERENCES

"Method And System For Cellular Network Traffic Redirection" application Ser. No. 10/635,804 filed on Aug. 05, 2003.
Q71X SCCP
Q70X MTP
Q77X TCAP
GSM 1111 SIM and Mobile Interface
GSM 1114 SIM Toolkit
IR 7320 Steering of Roaming
GSM 902 on MAP Specification
Digital cellular telecommunications system (Phase 2+)
Mobile Application Part (MAP) Specification
(3GPP TS 09.02 version 7.9.0 Release 1998)
GSM 340 on SMS
Digital cellular telecommunications system (Phase 2+);
Technical realization of the Short Message Service (SMS);
(GSM 03.40 version 7.4.0 Release 1998)
GSM 348 Security and OTA,
GSM 31048 Security and OTA,
GSM 23119 Gateway Location Register,
GSM 408 Mobile Radio Interface Network Layer
GSM 23122 Mobile Station Procedure
GSM 24008 Mobile Radio Interface Network Layer
GSM22011 Service Accessibility
GSM25304 Idle Mode Selection
GSM29010 Error Network Mapping
GSM 29002 MAP Protocol

APPENDIX

| Acronym | Description |
| --- | --- |
| 3G | Third generation of mobile |
| BSC | Base Station Controller |
| BCSM | Basic Call State Model |
| CAMEL | Customized Application for Mobile Enhanced Logic |
| CDMA | Code Division Multiplexed Access |
| CLI | Calling Line Identification |
| CdPA | Called Party Address |
| CAP | Camel Application Part |
| CC | Country Code |
| CB | Call Barring |
| CSI | Camel Subscription Information |
| DPC | Destination Point Code |
| GMSC | Gateway MSC |
| GPRS | General Packet Radio System |
| GLR | Gateway Location Register |
| GSM | Global System for Mobile |
| GSM SSF | GSM Service Switching Function |
| GT | Global Title |
| HLR-H | HLR from HPMN |
| HLR | Home Location Register |
| HPMN | Home Public Mobile Network |
| IMSI | International Mobile Subscriber Identity |
| IN | Intelligent Network |
| ISG | International Signal Gateway |
| INAP | Intelligent Network Application Part |
| ISD | MAP Insert Subscriber Data |
| IAM | Initial Address Message |
| IDP | Initial DP IN/CAP message |
| ISUP | ISDN User Part |
| LUP | MAP Location Update |
| MAP | Mobile Application Part |
| MCC | Mobile Country Code |
| MCC | Mobile Country Code |
| ME | Mobile Equipment |
| MNC | Mobile Network Code |
| MO | Mobile Originated |
| MSC | Mobile Switching Center |

APPENDIX-continued

| Acronym | Description |
| --- | --- |
| MSISDN | Mobile Subscriber ISDN Number |
| MSRN | Mobile Subscriber Roaming Number |
| MT | Mobile Terminated |
| MTP | Message Transfer Part |
| NP | Numbering Plan |
| NPI | Numbering Plan Indicator |
| NDC | National Dialing Code |
| ODB | Operator Determined Barring |
| OTA | Over The Air |
| O-CSI | Originating CAMEL Subscription Information |
| PRN | Provide Roaming Number |
| RNA | Roaming Not Allowed |
| RR | Roaming Restricted due to unsupported feature |
| RI | Routing Indicator |
| SPC | Signal Point Code |
| SRI | Send Routing Information |
| SCCP | Signal Connection Control part |
| STP | Signal Transfer Point |
| STP-H | HPMN STP |
| SRI-SM | Send Routing Information For Short Message |
| SSP | Service Switch Point |
| SSN | Sub System Number |
| SIM | Subscriber Identify Module |
| STK | SIM Tool Kit Application |
| SM-RP-UI | Short Message Relay Protocol User Information |
| STP | Signal Transfer Point |
| SS | Supplementary Services |
| TR | Traffic Redirection |
| T-CSI | Terminating CAMEL Service Information |
| TP | SMS Transport Protocol |
| UDHI | User Data Header Indicator |
| UDH | User Data Header |
| UD | User Data |
| VAS | Value Added Service |
| VLR-V | VLR from VPMN |
| VLR | Visited Location Register |
| VMSC | Visited Mobile Switching Center |
| VPMN | Visited Public Mobile Network |

I claim:

1. A method for controlling traffic between a Home Public Mobile Network (HPMN) and a Visiting Public Mobile Network (VPMN) of a roaming mobile station, the method comprising:
    detecting a traffic redirection (TR) attempt for the roaming mobile station, by observing exchange of at least one registration message between the VPMN and the HPMN; and
    thwarting the detected TR attempt.

2. The method of claim 1, wherein the TR attempt for the roaming mobile station is initiated by the HPMN.

3. The method of claim 2, wherein detecting the TR attempt comprises monitoring passively the exchange of the at least one registration message between the HPMN and the VPMN.

4. The method of claim 3, wherein thwarting the TR attempt comprises sending one or more registration response messages in response to the at least one registration message, the one or more registration response message thwart the TR attempt.

5. The method of claim 4, wherein the one or more registration response messages are one or more location update (LU) messages sent on behalf of the roaming mobile station in response to at least one LU reject message as the at least one registration message.

6. The method of claim 5, wherein the one or more LU messages are sent to the HPMN at a configurable interval of time.

7. The method of claim 4, wherein the one or more registration response messages are sent to the HPMN greater than an expected number of times.

8. The method of claim 2, wherein detecting the TR attempt comprises monitoring actively the exchange of the at least one registration message between the HPMN and the VPMN.

9. The method of claim 8, wherein thwarting the TR attempt comprises sending one or more registration response messages in response to the at least one registration message.

10. The method of claim 9, wherein the one or more registration response messages are one or more location update (LU) messages sent on behalf of the roaming mobile station in response to at least one LU reject message as the at least one registration message.

11. The method of claim 10, wherein the one or more LU messages are sent to the HPMN at a configurable interval of time.

12. The method of claim 8, wherein a MAP ISD ACK message is sent on behalf of the roaming mobile station in response to a MAP ISD message being observed as the at least one registration message subsequent to observing a MAP LUP message from the HPMN.

13. The method of claim 12, wherein the MAP ISD message comprises one of a RR, and RNA.

14. The method of claim 8, wherein one or more LU messages are sent on behalf of the roaming mobile station in response to one of a MAP LUP ACK message, a MAP Abort message and a TCAP Abort message being observed as the at least one registration message subsequent to observing a MAP LUP message from the HPMN.

15. The method of claim 14, wherein the MAP LUP ACK message comprises one of a System Failure, Unexpected Data Value, RNA and Missing Data corresponding to the roaming mobile station.

16. The method of claim 14, wherein the one or more LU messages are sent to the HPMN at a configurable interval of time.

17. The method of claim 8, wherein one of a TCAP abort and a TCAP reject is sent on behalf of the roaming mobile station in response to an OTA TR message being observed as the at least one registration message from the HPMN.

18. The method of claim 2, wherein one or more registration response messages are sent within the VPMN on behalf on the HPMN and in response to receipt of the at least one registration message sent by the HPMN.

19. The method of claim 2, wherein detecting the TR attempt comprises checking receipt of at least one of one or more error messages and one or more success messages from the HPMN in response to one or more registration response messages.

20. The method of claim 19, wherein the at least one of one or more error messages and one or more success messages are received intermittently within a configurable interval of time.

21. The method of claim 19, wherein the at least one of one or more error messages and one or more success messages form a ratio exceeding a configurable threshold.

22. The method of claim 1, wherein the TR attempt for the roaming mobile station is initiated by the VPMN.

23. The method of claim 22, wherein detecting the TR attempt comprises monitoring actively the exchange of the at least one registration message between the HPMN and the VPMN.

24. The method of claim 22, wherein one or more LU request messages are sent as the one or more registration response messages in response to one of a MAP abort and a TCAP abort detected corresponding to at least one VPMN, wherein the one or more LU request messages are sent correspondingly on behalf of the at least one VPMN.

25. The method of claim 1, wherein thwarting the TR attempt further comprises sending one or more profile update messages for the roaming mobile station to the VPMN in response to corresponding one or more LU messages from one or more VLR subsequent to the roaming mobile station being registered with the VPMN.

26. A system for controlling traffic between a Home Public Mobile Network (HPMN) and a Visiting Public Mobile Network (VPMN) of a roaming mobile station, the system comprising:
a TR probe for detecting a traffic redirection (TR) attempt for the roaming mobile station, by observing exchange of at least one registration message between the VPMN and the HPMN; and
an anti-TR unit for thwarting the TR attempt by sending one or more registration response messages in response to the at least one registration message received from a switch.

27. The system of claim 26, wherein the TR probe is integrated with the anti-TR unit.

28. The system of claim 26, wherein the switch is a roaming STP configured to assist in exchange of the at least one registration message and the one or more registration response messages between the HPMN, and the anti-TR unit and TR probe.

29. The system of claim 26, wherein in a passive monitoring mode, the anti-TR unit sends one or more location update (LU) messages as the one or more registration response messages in response to at least one location update reject message from the switch, wherein the one or more location update messages are sent to the HPMN on behalf of the roaming mobile station.

30. The system of claim 29, wherein the one or more LU messages are sent greater than an expected number of times to the HPMN.

31. The system of claim 29, wherein the one or more LU messages are sent to the HPMN at a configurable interval of time.

32. The system of claim 26, wherein in active monitoring mode, the TR probe detects the at least one registration message as an OTA TR sent to the roaming mobile station by the HPMN for initiating the TR.

33. The system of claim 32, wherein the anti-TR unit sends one of a TCAP abort and a TCAP reject as the one or more registration response messages in response to the OTA TR.

34. The system of claim 26, wherein in active monitoring mode, the anti-TR unit sends a MAP ISD ACK message as the one or more registration response messages on behalf of the HPMN when the at least one registration message is identified as one of a MAP ISD message, a MAP LUP ACK message and a MAP Abort message and are tracked by the TR probe subsequent to detecting a MAP LUP message from the HPMN, wherein the roaming mobile station is registered with the VPMN.

35. The system of claim 26, wherein in active monitoring mode, the anti-TR unit sends one or more LU request messages as the one or more registration response messages in response to one of a MAP abort and a TCAP abort detected corresponding to at least one VPMN, wherein the one or more LU request messages are sent correspondingly on behalf of at least one VPMN.

36. The system of claim 35, wherein the one of a MAP abort and a TCAP abort are detected by the TR probe.

37. The system of claim 35, wherein the one or more LU request messages are sent to the HPMN at a configurable interval of time.

38. The system of claim 26, wherein in active monitoring mode, the anti-TR unit sends one or more LU messages as the one or more registration response messages to the HPMN when one of a MAP LUP ACK message comprising one of a System Failure, Unexpected Data Value, RNA and Missing Data corresponding to the roaming mobile station is detected by the TR probe.

39. The system of claim 26 further comprises a GLR for sending one or more profile update messages for the roaming mobile station to the VPMN in response to corresponding one or more LU messages from one or more VLR subsequent to the roaming mobile station being registered with the VPMN.

40. The system of claim 26, wherein one or more registration response messages are sent within the VPMN on behalf on the HPMN and in response to receipt of the at least one registration message sent by the HPMN.

41. The system of claim 26, wherein the TR probe detects the TR attempt by checking receipt of at least one of one or more error messages and one or more success messages from the HPMN in response to the one or more registration response messages associate with the roaming mobile station.

42. The system of claim 41, wherein the at least one of one or more error messages and one or more success messages are received intermittently within a configurable interval of time.

43. The system of claim 41, wherein the at least one of one or more error messages and one or more success messages form a ratio exceeding a configurable threshold.

44. The system of claim 26, wherein the TR probe detects the TR attempt initiated by the HPMN by checking receipt of a LU rejection error in response to each of LU messages sent as the one or more registration response messages on behalf of the roaming mobile station.

45. The system of claim 26, wherein the TR probe detects the TR attempt initiated by the HPMN by checking receipt of an LU error with one of an RNA and an RR for one or more of times in response to an LU message sent to the HPMN and a subsequent receipt of an LU ACK message with success corresponding to a subsequent LU message.

46. A computer program product comprising a computer useable medium including a computer usable program code for controlling traffic between a Home Public Mobile Network (HPMN) and a Visiting Public Mobile Network (VPMN) of a roaming mobile station, the computer program product comprising:

computer usable program code for detecting a traffic redirection (TR) attempt for the roaming. mobile station, by observing exchange of at least one registration message between the VPMN and the HPMN; and computer usable program code for thwarting the TR attempt.

47. The computer program product of claim 46, wherein detecting the TR attempt comprises monitoring passively the exchange of the at least one registration message between the HPMN and the VPMN.

48. The computer program product of claim 47, wherein thwarting the TR attempt comprises sending one or more registration response messages in response to the registration message.

49. The computer program product of claim 46, wherein detecting the TR attempt comprises monitoring actively the exchange of the at least one registration message between the HPMN and the VPMN.

50. The computer program product of claim 49, wherein thwarting the TR attempt comprises sending one or more registration response messages in response to the registration message.

51. The computer program product of claim 50, wherein the one or more registration response messages are one or more location update (LU) messages sent on behalf of the roaming mobile station.

52. The computer program product of claim 51, wherein the one or more LU messages are sent to the HPMN at a configurable interval of time.

53. The computer program product of claim 49, wherein a MAP ISD ACK message is sent on behalf of the roaming mobile station in response to a MAP ISD message being observed as the at least one registration message subsequent to observing a MAP LUP message from the HPMN.

54. The computer program product of claim 50, wherein one or more LU messages are sent on behalf of the roaming mobile station in response to one of a MAP LUP ACK message, a MAP Abort message and a TCAP Abort message being observed as the at least one registration message subsequent to observing a MAP LUP message from the HPMN.

55. The computer program product of claim 54, wherein the one or more LU messages are sent to the HPMN at a configurable interval of time.

56. The computer program product of claim 50, wherein one of a TCAP abort and a TCAP reject is sent on behalf of the roaming mobile station in response to an OTA TR message being observed as the at least one registration message from the HPMN.

57. The computer program product of claim 46, wherein one or more registration response messages are sent within the VPMN on behalf on the HPMN and in response to receipt of the at least one registration message sent by the HPMN.

58. The computer program product of claim 46, wherein one or more LU request messages are sent as the one or more registration response messages in response to one of a MAP abort and a TCAP abort detected corresponding to at least one VPMN, wherein the one or more LU request messages are sent correspondingly on behalf of the at least one VPMN.

59. The computer program product of claim 46, wherein thwarting the TR attempt further comprises sending one or more profile update messages for the roaming mobile station to the VPMN in response to corresponding one or more LU messages from one or more VLR subsequent to the roaming mobile station being registered with the VPMN.

60. The computer program product of claim 46, wherein detecting the TR attempt comprises checking receipt of at least one of one or more error messages and one or more success messages from the HPMN in response to one or more registration response messages.

* * * * *